(12) United States Patent
Collette et al.

(10) Patent No.: US 7,143,799 B2
(45) Date of Patent: Dec. 5, 2006

(54) THREE-DIMENSIONAL SIPES FOR TREADS

(75) Inventors: Jean Joseph Collette, Arlon (BE);
Philippe Marie Manne, Warken (LU);
André Domange, Etalle (BE); Pascale De Briey-Terlinden, Attert (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 124 days.

(21) Appl. No.: 10/717,780

(22) Filed: Nov. 20, 2003

(65) Prior Publication Data

US 2005/0109438 A1    May 26, 2005

(51) Int. Cl.
*B29C 33/42*    (2006.01)
*B60C 11/12*    (2006.01)

(52) U.S. Cl. ............... 152/209.21; 152/209.23; 152/DIG. 3; 425/28.1; 425/35; 425/46

(58) Field of Classification Search ........... 152/209.18, 152/209.21, 209.23, DIG. 3; 425/28.1, 35, 425/46
See application file for complete search history.

(56) References Cited

U.S. PATENT DOCUMENTS

| | | | | |
|---|---|---|---|---|
| 4,794,965 A | | 1/1989 | Lagnier ............... | 152/209 R |
| 4,994,126 A | * | 2/1991 | Lagnier ............... | 152/DIG. 3 |
| 5,095,963 A | * | 3/1992 | Maitre ............... | 152/DIG. 3 |
| 5,350,001 A | | 9/1994 | Beckmann et al. ...... | 152/209 R |
| 5,783,002 A | | 7/1998 | Lagnier ............... | 152/209 R |
| 6,564,840 B1 | | 5/2003 | Kleinhoff et al. ...... | 152/209.18 |
| 2002/0017349 A1 | | 2/2002 | Lopez ............... | 152/209.18 |
| 2002/0053383 A1 | | 5/2002 | Kleinhoff et al. ...... | 152/209.18 |
| 2002/0139164 A1 | * | 10/2002 | Ishihara ............... | 152/DIG. 3 |
| 2002/0170643 A1 | | 11/2002 | Kuze ............... | 152/209.5 |
| 2003/0201048 A1 | | 10/2003 | Radulescu et al. ...... | 152/209.25 |

FOREIGN PATENT DOCUMENTS

| | | | |
|---|---|---|---|
| EP | 1073562 | | 2/2001 |
| EP | 1 223 054 A1 | | 7/2002 |
| EP | 1243390 | * | 9/2002 |
| GB | 1150295 | | 4/1969 |
| JP | 558118 | | 3/1993 |
| JP | 6143941 | | 5/1994 |
| JP | 10-80923 | * | 3/1998 |
| JP | 2000-102925 | * | 4/2000 |
| JP | 2000318413 | | 11/2000 |
| JP | 2002-192916 | * | 7/2002 |
| JP | 2002-321509 | * | 11/2002 |
| JP | 2002-356105 | * | 12/2002 |
| WO | WO 99/48707 | | 9/1999 |

* cited by examiner

*Primary Examiner*—Steven D. Maki
(74) *Attorney, Agent, or Firm*—Nancy T. Krawczyk

(57) ABSTRACT

Both a mold blade for forming sipes and the sipe so formed in a tire tread element have three dimensional portions. In the formed sipe, the three dimensional portion creates a constant interlocking of the opposing sipe faces. The blade and the sipe have at least one row of alternating polygonal shaped recesses and protrusions. The recesses and protrusions terminate in a vertex; the vertex has a planar, or two-dimensional, configuration that is parallel to either-the blade centerline or the sipe centerline.

19 Claims, 8 Drawing Sheets

THREE-DIMENSIONAL SIPES FOR TREADS

FIELD OF THE INVENTION

The present invention is directed to a pneumatic tire. More specifically, the present invention is directed to the tread of a tire and the sipes in the tire tread.

BACKGROUND OF THE INVENTION

The tread portion of a pneumatic tire generally comprises a plurality of circumferentially and laterally extending grooves defining ground engaging rubber elements, the elements being in the form of blocks or ribs or combinations thereof. The particular size and shape of the tread elements contribute significantly to the overall performance of the tire and are for that reason designed to achieve the desired tire characteristics.

Winter type tires, as well as all-season type tires, usually have multiple sipes. A sipe is a groove having a width in the range of about 0.1% to about 1% of the tread width, i.e. the arc length of the tread surface in the axial direction. The sipe tends to close when it is located in the tire footprint at zero speed and under normal load and pressure. Sipes are typically formed by steel blades inserted into a cast or machined mold or tread ring therefor.

A sipe may extend circumferentially or laterally about the tread in a straight, curved, or zigzag manner and may be as deep as the primary tread grooves or have a depth that is greater than the groove depth. The sipes can pass through the sides of the ribs and tread blocks or be confined to the interior of the tread elements. It is also known to have sipes lying in planes which are not perpendicular to tangents to the surface of the tread at their point of intersection; the inclination of the planes defining neighboring sipes can be identical or differ step wise along the tread element length. It is further known to use sipes having a depth that varies along its length.

The presence of sipes in a tread increases the number of biting edges in the tread. The local high pressure at each biting edge improves the wiping and digging action of the tread surface, conferring to a tire excellent traction on snow and ice. Furthermore, sipes improve the flexibility of the tread elements without destroying their solidity. The easy relative longitudinal sliding between the opposed faces of the sipe weakens the resistance of the tread elements to flexing in the contact area between tread and road and therefor slows down the heat buildup of the tire; however, the sliding of the opposed faces of the sipes creates friction between the opposing sipe faces and can lead to wear of the sipes.

GB 1,150,295 discloses a tire with a rib having a plurality of sipes formed therein. The sipes have a three-dimension aspect, wherein a plurality of peaks and valleys are defined though a sipe centerline. The peaks and valleys formed are either a single point of maximum depth or a line of maximum depth. Due to the sharp lines forming the sipe configuration, while the opposing sides of the sipe interlock, there is increased abrasion at the points.

U.S. Pat. No. 5,783,002 discloses a three dimensional sipe for tire treads. The protrusions and cavities formed all have a domed configuration. The rounded opposing edges of the sipe reduces rubbing but doesn't eliminate the movement of the opposing sipe faces. EP 1073562 shows circular 3-d siping with flat spaces therebetween. The flat portions of the sipe are still subject to rubbing and wear.

SUMMARY OF THE INVENTION

The present invention is directed to a tire tread having ground engaging elements having sipes therein. The sipe has a three dimensional portion formed from interlocking projections of alternating recesses and protrusions. The resulting constant interlocking aspect of the sipe prevents slippage of opposing faces of the sipe, reducing wear of the sipe faces. The effective length of the sipe is also increased by the planar bends in the sipe. The increased effective length reduces sudden decompression of the sipe as the tread element travels out of the tire footprint. This yields improved tread wear as the trailing edge of the tread element is not snapping out of the footprint.

In accordance with one aspect of the invention, disclosed is a tire tread having a plurality of ground engaging elastomeric elements. At least one of the tread elements has a sipe. The sipe has a radial depth, a first sipe face, an opposing sipe face, and a centerline located equidistant from the opposing sipe faces. Each sipe face has at least one horizontal row of alternating recesses and protrusions and each recess on one sipe face is aligned with a protrusion on the opposing face. Each recess or protrusion terminates in a planar vertex spaced from the centerline and the planar vertex is parallel to the sipe centerline.

In other aspects of the invention, each sipe face has at least two horizontal rows of alternating recesses and protrusions. The alternating recesses and protrusions in the horizontal rows may form alternating recesses and protrusions in the radial direction of the sipe. However, depending on the configuration of the projections, while the projections in the horizontal rows are alternating recesses and protrusions, the projections in the radial direction may not alternate.

In another aspect of the invention, each planar vertex of the projections of the sipe in each sipe face has a polygonal configuration. The polygonal configuration has at least four sides, and may be selected from the group consisting of quadrilateral, pentagonal, hexagonal, heptagonal, octagonal, nonagonal, decagonal, hendecagonal, and dodecagonal. In a single sipe, the planar vertex of the projections may be a combination of different polygonal shapes.

In another aspect of the invention, the cross sectional area of the protrusions and recesses, as determined at the sipe centerline, decreases as the radial depth of the sipe increases.

In another aspect of the invention, each protrusion and recess has at least four planes extending at an angle from the sipe centerline to its planar vertex. The four planes may be inclined at identical angles relative to the sipe centerline and as measured from within the protrusion or recess. Alternatively, one of the planes may be inclined at a different angle than the other planes relative to the sipe centerline and as measured from within the protrusion or recess.

Also disclosed, in accordance with the present invention, is a mold blade that is mounted inside a tire mold and used to form a sipe in a tire tread. The blade has planar portions and at least one three dimensional portion and has a defining blade centerline that is parallel to the plane of the planar portions of the blade. The three dimensional portion of the blade has at least one horizontal row of alternating recesses and protrusions, wherein each recess or protrusion terminates in a planar vertex spaced from the blade centerline. The planar vertex is parallel to the blade centerline.

In another aspect of the invention, at the blade centerline, each recess and protrusion has a polygonal configuration. The planar vertex of each projection has a geometric configuration that mimics or has the same geometric configuration as the projection at the blade centerline.

In another aspect of the invention, the mold blade has at least two horizontal rows of alternating recesses and protrusions. The horizontal rows may be continuous across the three dimensional portion of the blade or the rows may be discontinuous, forming a planar portion between the discontinuous rows.

In another aspect of the invention, the three dimensional portion of the blade may be characterized by the projections forming vertical rows. The vertical rows may or may not be alternating recesses and protrusions, depending on the polygonal configuration of the projections.

Definitions

The following definitions are controlling for the disclosed invention.

"Axial" and "axially" are used herein to refer to lines or directions that are parallel to the axis of rotation of a tire.

"Blade" means a protrusion in a tire curing mold that forms part of the tread design. The protrusion forms a corresponding depression in the finished tire tread.

"Radial" and "radially" are used to mean directions radially toward or away from the axis of rotation of the tire.

"Sipes" refer to small grooves molded into tread elements of a tire that subdivide the tread elements and improve traction characteristics. Sipes have a width in the range of about 0.1% to about 1% of the tread width and tend to close completely in a tire footprint. The depth of a sipe may vary around the circumference of the tread, or the depth of one sipe may be constant but vary from the depth of another sipe in the tire.

BRIEF DESCRIPTION OF THE DRAWINGS

The invention will be described by way of example and with reference to the accompanying drawings in which:

FIG. 6b is a flat view of the 3-d portion of the blade of FIG. 6a;

DETAILED DESCRIPTION OF THE INVENTION

The following language is of the best presently contemplated mode or modes of carrying out the invention. This description is made for the purpose of illustrating the general principles of the invention and should not be taken in a limiting sense. The scope of the invention is best determined by reference to the appended claims.

Figure 1:
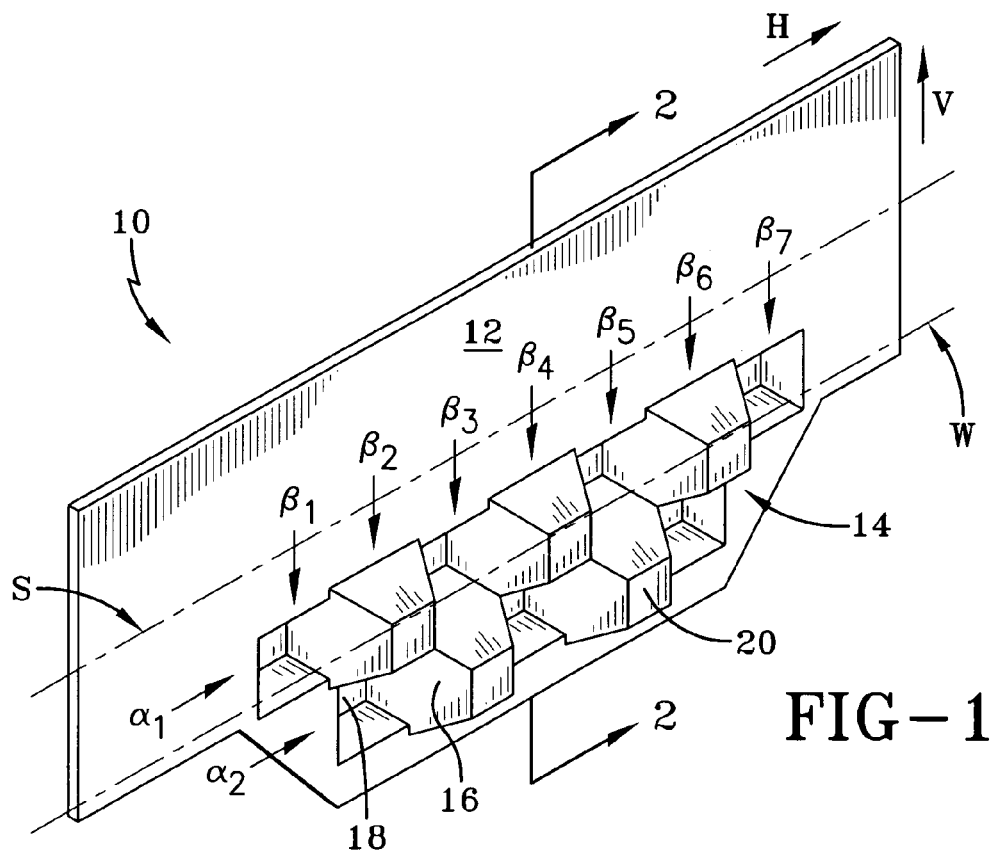
FIG. 1 is a perspective view of a sipe forming blade.

FIG. 1 illustrates a blade 10 in accordance with the present invention. The blade 10 has a planar portion 12 and a three-dimensional portion 14 comprising a plurality of adjacent projecting elements 16, seen on one side of the blade 10 as protrusions 18 and recesses 20, see FIG. 2. The blade 10 is made of metal, preferably steel, and the projecting elements 16 are made by stamping or embossing the steel sheet. Such a blade 10 is mounted into a tread mold such that the top planar portion 12 of the blade 10 is closer to the mold and the projections 16 are in the open space of the mold to form a three-dimensional portion in a sipe.

Figure 2:
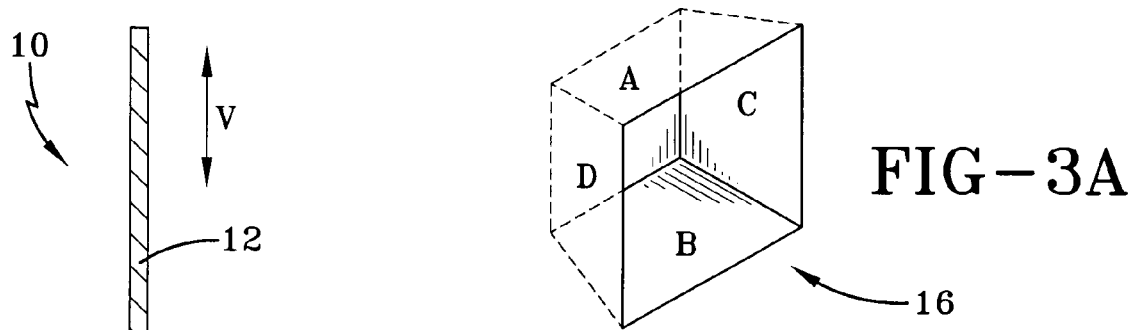
FIG. 2 is a side view of the blade.

The three-dimensional blade 10 is most readily defined as having a centerline CL, the centerline CL being a two-dimensional plane that is in the same plane as that portion 12 of the blade 10 which is not stamped or embossed, see FIG. 2, and as having a horizontal direction H and a vertical direction V. The blade projections 16 are formed on alternating sides of the blade centerline CL. The projections 16 form horizontal rows α1, α2 and vertical rows β1–β7. The projections 16 form alternating protrusions 18 and recesses 20 in each horizontal row α1, α2, as do the projections 16 in each vertical row β1–β7.

The blade of FIG. 1 is illustrated as having only two horizontal rows α1, α2 of protrusions 18 and recesses 20; however, the number of rows may be increased to αn depending upon the size of the protrusions 18 and recesses 20 and upon the tread block depth. In accordance with the invention, there are at least two horizontal rows α1 and α2, and preferably two to five horizontal rows of projections 16. Also, the number of vertical rows β may be varied beyond that which is illustrated. The number of vertical rows can vary from two to any number βn which can be accommodated by the tread blocks and the size of the projections 16. The main requirement in accordance with the invention is that the arrangement of the horizontal rows a and the vertical rows β must be such as to have the recesses 16 alternating in either the horizontal or the vertical direction.

As seen in FIG. 2, each projection 16 initiates at the blade centerline CL and extends in a third dimension away from the blade centerline CL. At the centerline CL, each projection 16 has a polygonal shape. The illustrated shape is a square but may be any four sided polygon, i.e. a quadrilateral. As the projection 16 extends away from the blade centerline CL, the projection 16 maintains a polygonal shape until the vertex 22, or the maximum width of the projection 16, is reached. The vertex 22 of each projection 16 is a two dimensional plane, having both a vertical aspect and a horizontal aspect and is parallel to the blade centerline CL. If the projection 16 maintains the same polygonal shape as the projection 16 extends form the centerline CL to the vertex 22, than the vertex planar configuration mimics the polygonal shape at the blade centerline CL.

Figure 3A:
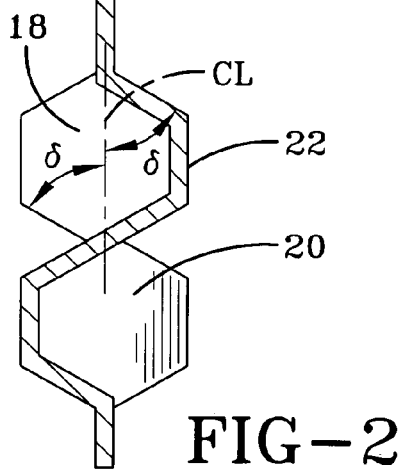
FIGS. 3a and 3b are alternative single projections.

Each projection 16 has a planar edge extending at an angle from the side defining the polygon at the blade centerline CL. For the quadrilateral projection 16 of FIG. 3a, each projection 16 has four planar sides A, B, C, D. The top plane A is inclined at an angle of δ, as measured on the inside of the projection 16 from the centerline CL to the top plane A, see also FIG. 2. For a perfect polygon, all the sides of the polygon have the same length; for a "perfect" projection 16, the perfect polygon is maintained as the projection extends from the centerline CL to the vertex 22, each plane A, B, C, D is inclined at the same angle δ from the centerplane CL, as measured on the inside of the projection.

Figure 3B:
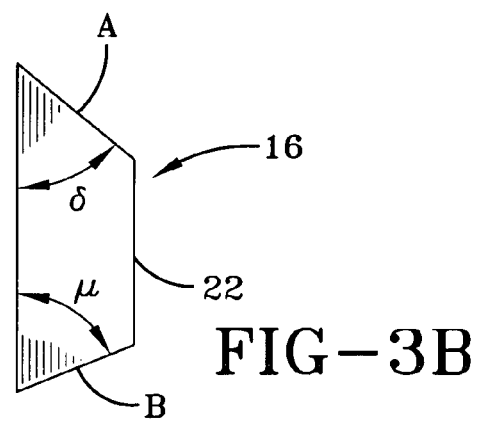

The planes A, B, C, or D may all have different inclination angles. The selection of the inclination angles is determined by the ease of manufacturing the blade 10, molding the tire with the blade 10, and the desired biting characteristics of the sipe. FIG. 3b illustrates a projection wherein the top plane A is inclined at angle δ while the bottom plane is inclined at different angle μ. The resulting vertex 22 still has the same overall polygonal shape, or geometric configuration, as the outline of the projection 16 at the centerline CL, but the relative dimensions of the sides of the polygonal configuration have changed due to the differing angles δ, μ.

When molding a tire using the blade 10, the extent of the blade 10 entering into the tread rubber may be varied depending on the desired tire characteristics. For a summer tire, the blade 10 may be inserted into the tread rubber to a depth S, see FIG. 1. For such a formed sipe, when the tread is unworn, the sipe presents itself as a straight line. Following tread wear, the sipe presentation changes. For a winter tire, the blade 10 may be inserted into the tread only to a depth W. For the unworn winter tire, the sipe formed is immediately presented as having multiple edges to increase the number of biting edges in the tread. For the summer tire, it is desired that wear takes the summer tire to the winter tire tread depth to provide the additional biting surfaces.

Figure 4A:
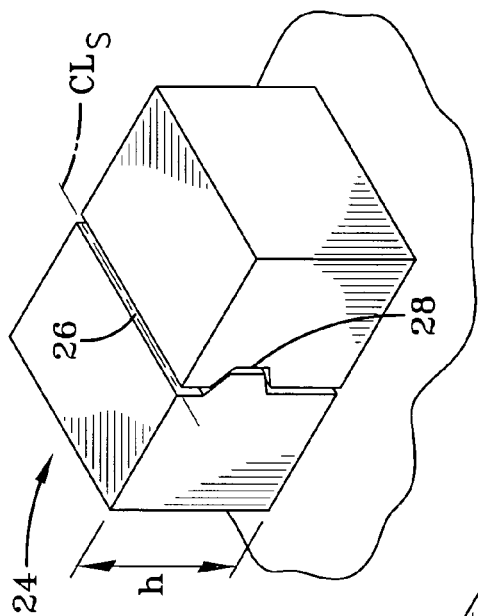
FIGS. 4a–4c illustrate a tread element with a sipe formed by the blade of FIG. 1, showing the element at various stages of wear.
Figure 4B:
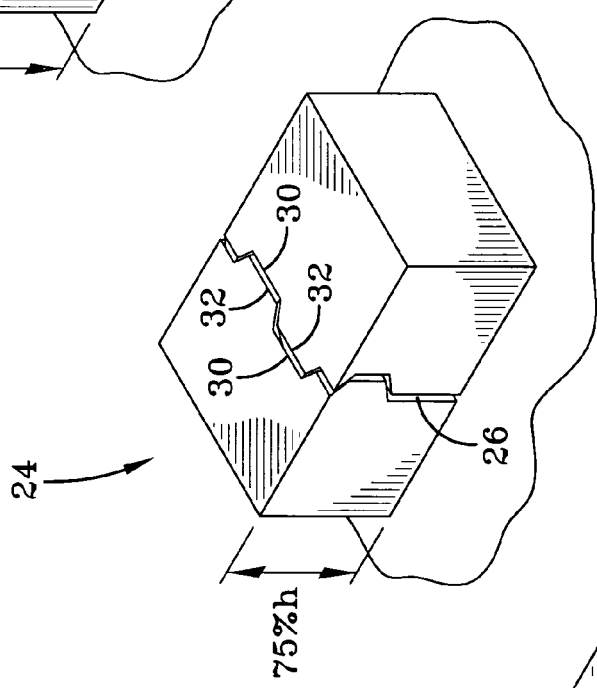
Figure 4C:
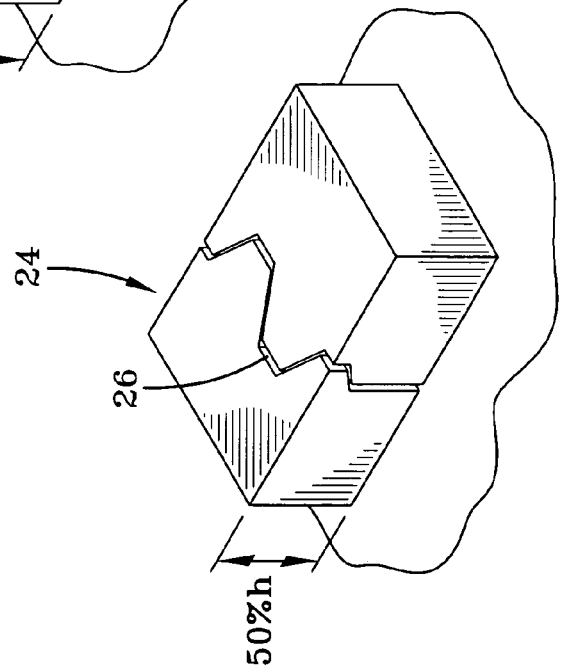

FIGS. 4a–4c illustrate a tread element 24 with a sipe 26 formed by the blade 10 of FIG. 1. The single elastomeric tread element 24 is a portion of a tread pattern, and is shown after the vulcanization step wherein the sipe 26 is formed into the tread rubber. The neighboring tread elements or ribs of the tread pattern have not been represented for simplification and clarity. Also, for simplicity in illustrating, the tread element 24 is shown with only a single sipe 26; the tread element 24 may be provided with multiple sipes 26 at any inclination angle relative to adjacent grooves. The sipe 26 may be defined as having a centerline CLs that is equidistant from the vertexes 28 of the alternating sipe recesses 30 and protrusions 30 formed. The sipe centerline CLs corresponds to the blade centerline when the sipe 26 is being formed.

The tread element 24 is shown in different states of wear. As represented in FIG. 4a, the tread element 24 is unworn, and at the tread surface, the sipe 26 presents as a single line; this is a summer tire tread. The same tread portion shown in FIG. 4b, is worn to about 25% of its original radial height h and the radially outer surface of the tread element 24 shows the varying configuration of alternating adjacent protrusions 32 and recesses 30 of the projections; for an unworn tread with this sipe presentation, the tire is molded to be a winter tire. The same tread portion shown in FIG. 4c is worn to a depth of about 50% of the original radial height h.

Figure 5:
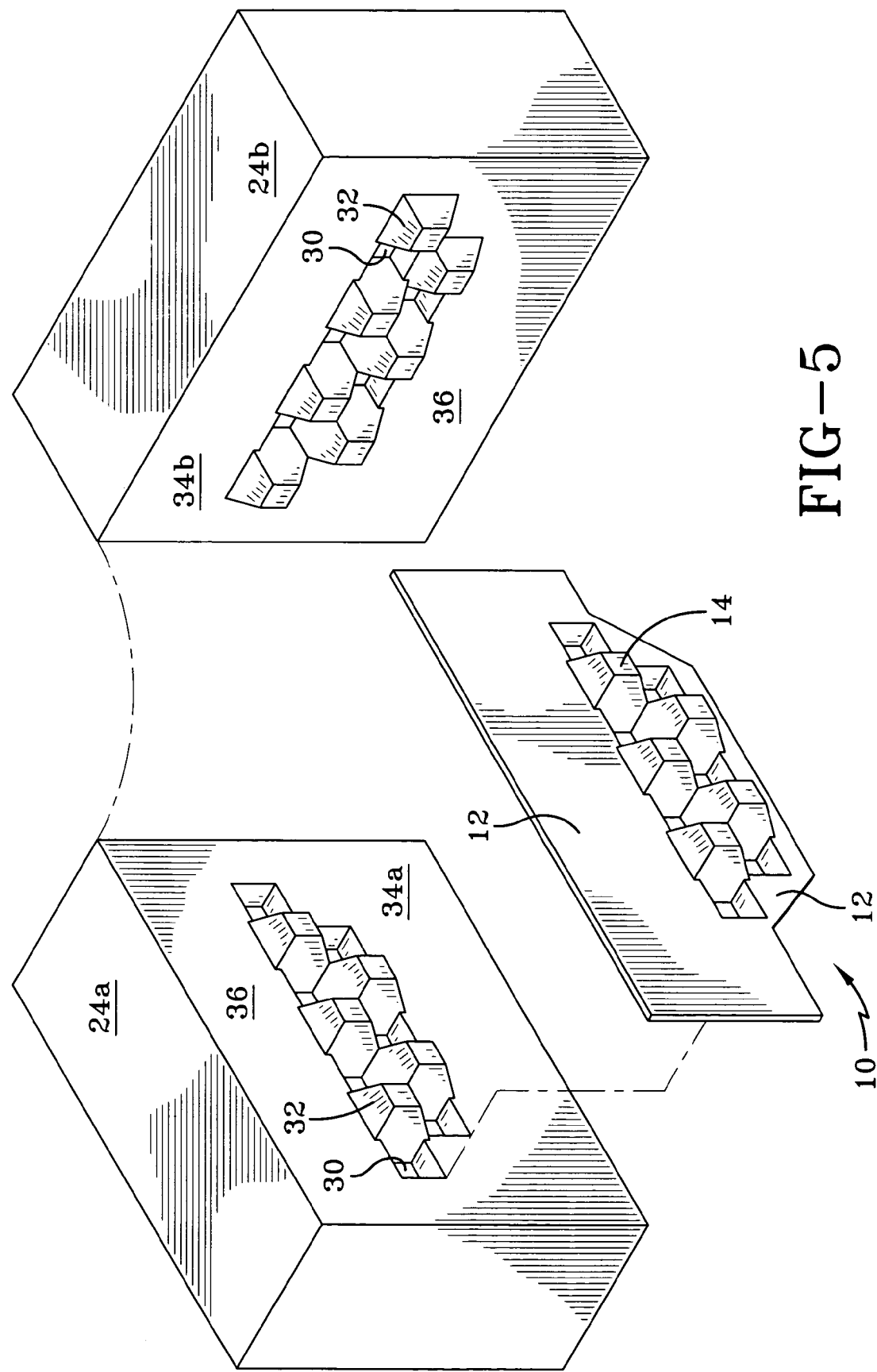
FIG. 5 is a cut view of a tread element showing the opposing sipe faces and the blade which forms the sipe faces.

FIG. 5 shows the tread element of FIGS. 4a–4c divided into, two portions 24a, 24b at the location of the sipe 26, in a perspective view, showing the opposing faces 34a, 34b of the sipe 26. The protrusions 32 in each sipe face 34a or 34b cooperate with the recesses 30 in the opposing element half. The planar sides A, B, C, D of the protrusions 32 and recesses 30 causes the opposing sipe faces 34a, 34b to interlock, limiting slippage of the two opposing sipe faces 34a, 34b. Each sipe face 34a or 34b is a identical to one side of the blade 10. Surrounding the 3-dimensional portion of the sipe 26, and each sipe face 34a, 34b, is a 2-dimensional sipe portion 36 formed by the planar portion 12 of the blade 10. The sipe 26 has a generally constant thickness, as seen in FIGS. 4a–4c, though portions of the sipe 26 are 3-dimensional and 2-dimensional.

Prior art three-dimensional siping, such as that discussed in EP 1073562 and U.S. Pat. No. 5,783,002, have either rounded curves or edges defining the interlocking portions. Such rounded edges still permit slippage between the opposing sipe faces. Such slippage also rubs the opposing faces of the sipe, gradually wearing the opposing sipe faces. In the sipe of the present invention, there is constant interlocking of the sipe. The other benefit of the sipe is that the effective length of the sipe is increased by the planar bends in the sipe. The increased effective length reduces sudden decompression of the sipe as the tread element travels out of the tire footprint. This yields improved tread wear as the trailing edge of the tread element is not snapping out of the footprint.

Figure 6A:
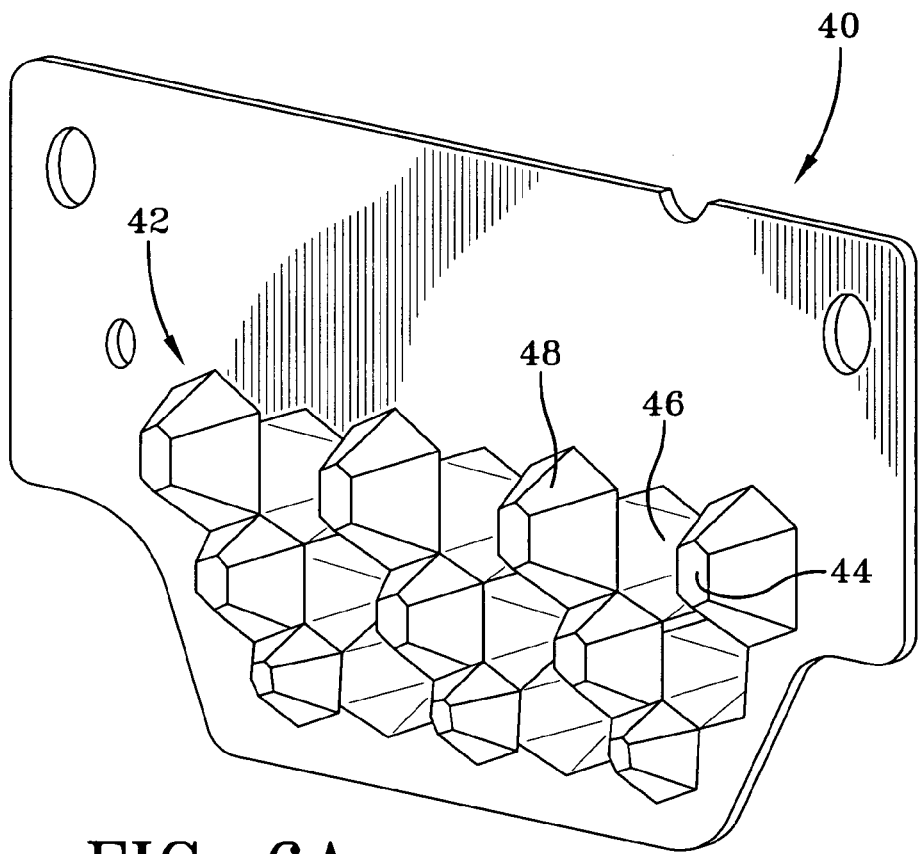
FIG. 6a is a perspective view of an alternative blade.
Figure 6B:
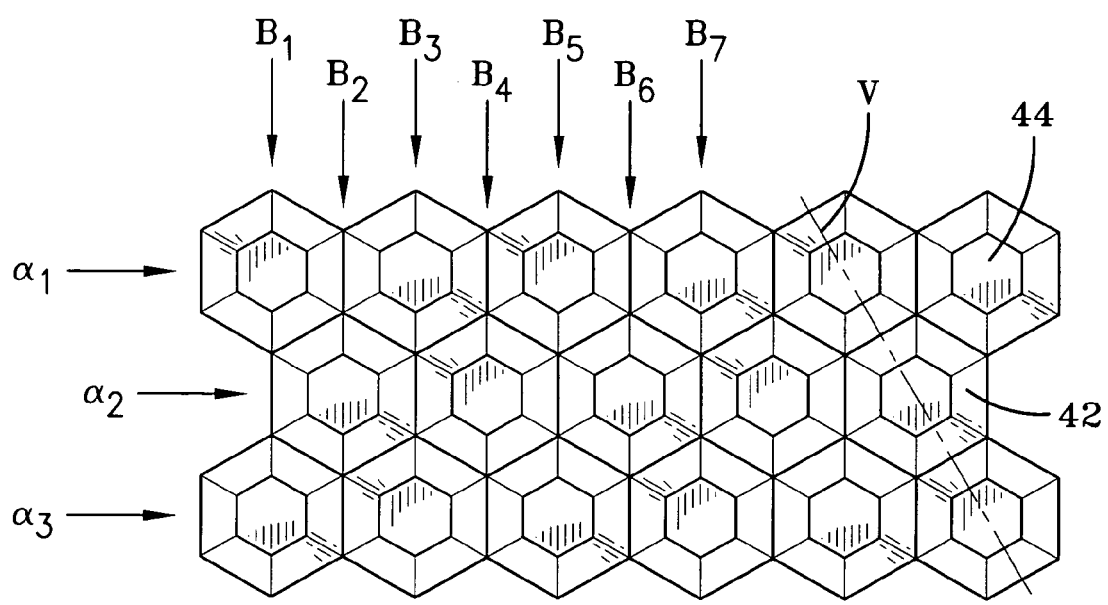

FIG. 6a shows a blade 40 for an alternative 3-d sipe; FIG. 6b is a simplified illustration of the 3-d portion of the blade 40 and the 3-d portion of a sipe face that would be formed by the blade 40. The polygonal shape of each projection 42 at the blade centerline and sipe centerline is a hexagon. As with the quadrilateral projections 16 of FIG. 1, the vertex 44 of each projection 42 is planar and mimics the configuration of the projection 42 at the blade and at the centerline of the sipe formed by the blade 40. Due to the polygonal shape, the horizontal rows α1, α2, and α3 are vertically overlapping, and the vertical rows β1 to βy are also horizontally overlapping. The recesses 46 and protrusions 48 in at least each horizontal row are alternating; however, the projections 42 are no longer alternating recesses 46 and protrusions 48 in the vertical direction. In the illustrated blade, the recesses 46 and protrusions 48 are aligned along an inclined direction V.

By forming the projections 42 with a hexagonal configuration at the centerline of the blade 40 and at the centerline of the formed sipe, as the resulting sipe wears, the sipe never has a hard line as would be presented with a horizontally extending top line to the projections. Additionally, the alignment of the recesses 46 and protrusions 48 can be varied to achieve different tread stiffness and flexibility characteristics.

Figure 7A:
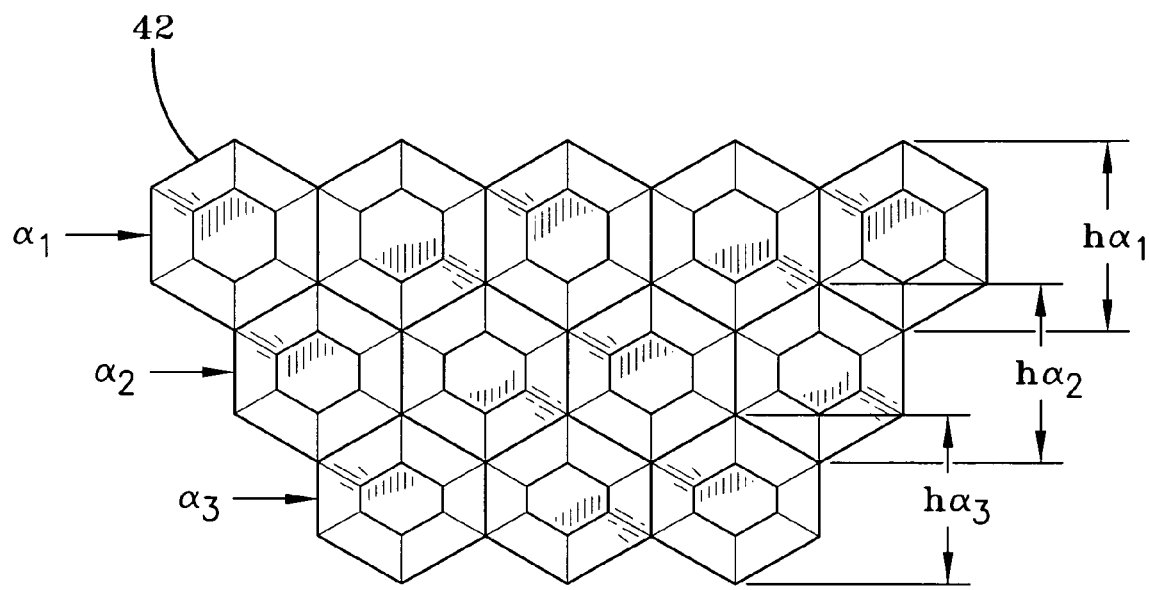
FIGS. 7a, 7b, 8a, and 8b illustrate alternative 3-d blade and sipe configurations.

FIG. 7a shows a variation of the hexagonal blade and sipe. The size of the hexagonal projections 42 decreases as the number of horizontal rows a increases. In particular, the radial height hα of the projections 42 decreases with blade or sipe depth; that is hα1>hα2>hα3.

Figure 7B:
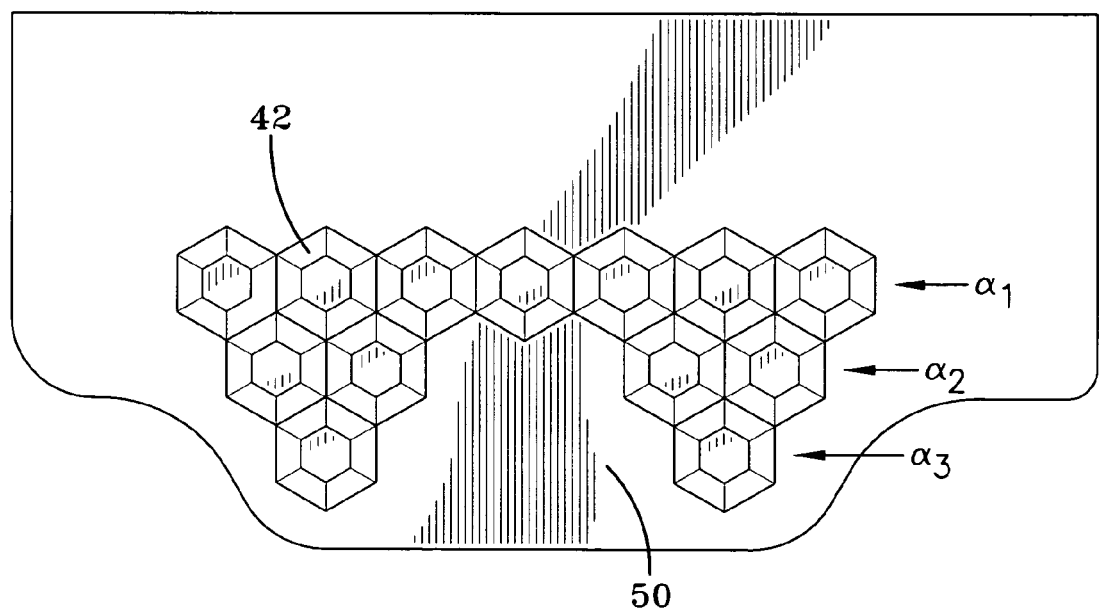

FIG. 7b shows another variation of the hexagonal blade and sipe. In the blade, the second and third horizontal rows α2, α3 have substantially fewer number of projections 42 than the first horizontal row α1 and forming a gap 50 between projections 42 in both the second and third horizontal rows α2, α3. In the formed sipe, the portion of the sipe corresponding to the blade gap 50 would be flat or two-dimensional. Also, as seen in FIGS. 4a–4c, and applicable to all of the disclosed 3-d configurations, two-dimensional sipe portions may be located on any side of the 3-d sipe portion. The two-dimensional portion may be the radially innermost portion of the sipe, or may be located on both sides of the 3-d sipe portion.

Figure 8A:
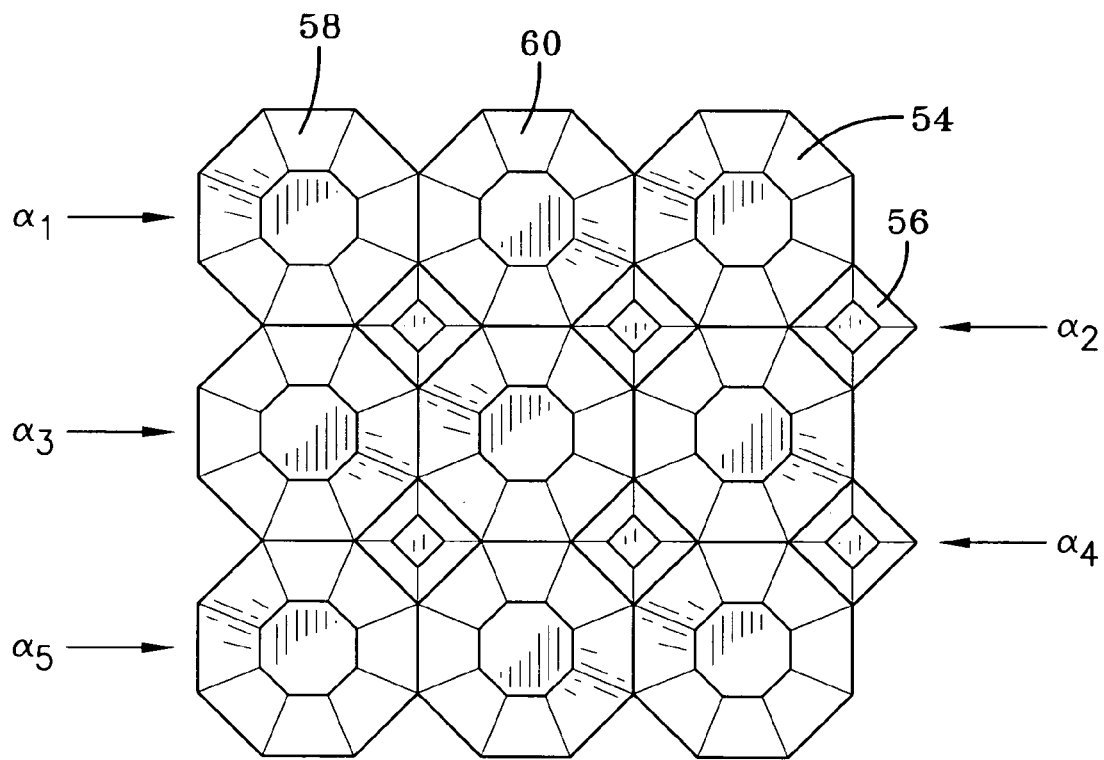
Figure 8B:
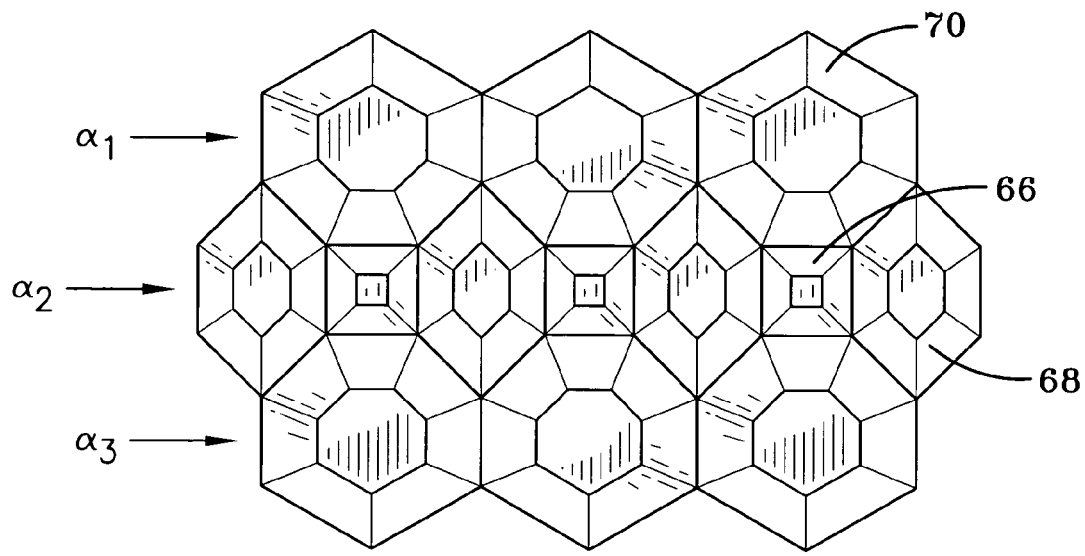

FIG. 8a shows another variation of the 3-dimensional portion of a blade or sipe. Alternating horizontal rows α1, α3, α5 are formed from octagonal projections 54 at the blade centerline CL or sipe centerline CLs. Located between the octagonal projection rows are rows α2, α4 formed from quadrilateral projections 56. The octagonal projections 54 are formed as alternating recesses 58 and protrusions 60; while the quadrilateral projections 56 may also be alternating recesses and protrusions or all recesses or protrusions. FIG. 8b illustrates a 3-dimensional portion of a blade or sipe wherein the projections are a combination of quadrilateral 66, hexagonal 68 and heptagonal 68 projections at the blade centerline CL or sipe centerline CLs. Rows α1, α3 formed of heptagonal projections 70 sandwich a row α2 of alternating quadrilateral and hexagonal projections 66, 68. The heptagonal projections 70 are alternating recesses and projections and the sandwiched projection row α2 is formed of alternating recesses and projections. Other combinations of different polygonal shapes with individual projections that have anywhere from three to twelve sides are possible and within the scope of the invention, though not illustrated herein. Also, 3-dimensional blade and sipe portions comprised of a single polygonal shape that will permit the projections to have contact with adjacent projections, similar to the illustrated quadrilateral 16 and hexagonal 42 projections are also contemplated by the inventors.

The 3-dimensional sipe may also be formed with other variations.

Figure 9A:
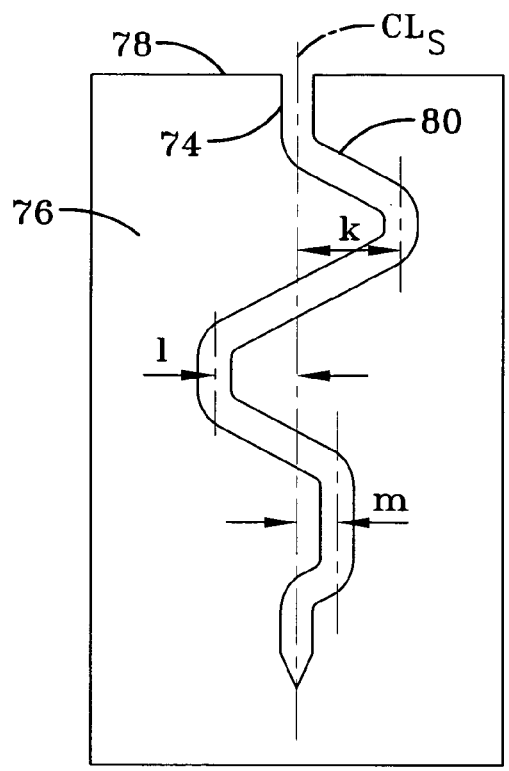
FIGS. 9a–9b illustrate gradient 3-d sipes.
Figure 9B:
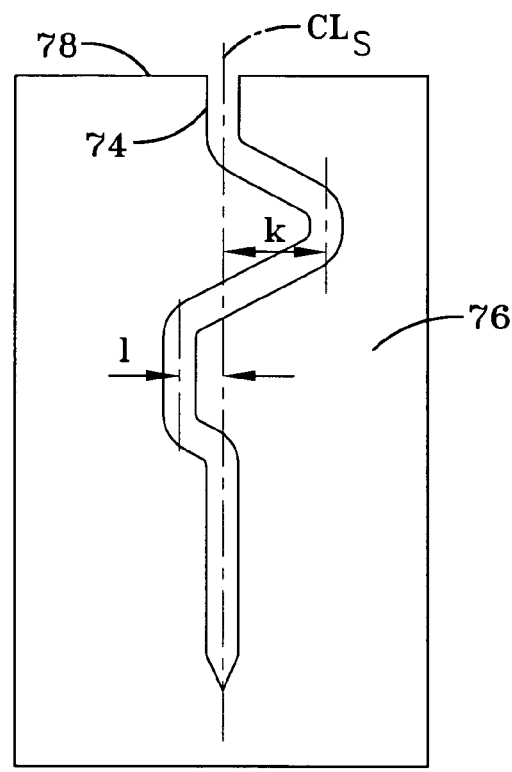

FIGS. 9a–9b shows a gradient 3-dimensional sipe 74 formed by a corresponding 3-dimensional blade. The sipe 74 is formed in a tread element 76 having a radially outer surface 78 that forms the tread surface of a tire. As the sipe depth increases, the sipe profile transfers from a stiff strong interlocking design to a softer, flatter blade design. Such a profile counteracts a stiffness increase of the tread element as the non-skid depth of the tread element decreases.

The motivation for providing such a gradient sipe comes from two conflicting stiffness requirements. The first requirement is the need for a higher stiffness of the tread when the tread is unworn. The presence of the 3-dimensional siping creates a locking mechanism to compensate any softness generated by the presence of multiple blades. The presence of the interlocking siping near the top of the blade is sufficient to achieve the desired effect. The second requirement is the need for lower stiffness when the tread block is worn, having a non-skid depth less than the original non-skid depth. The 2-dimensional portion at the lower edge of the sipe decreases the block stiffness of the worn block.

In the sipe of FIG. 9a, the sipe 74 has a 3-2-1 gradient ratio. The radially outermost portion of the sipe 74 has projections 80 of an axial width k, as measured from the sipe centerline CLs to the center of the projection's vertex 82. The next radially inward projection 80 has an axial width 1 less than the axial width k. The innermost projection 80 has an axial width m. The ratio of the widths k-l-m is 3-2-1.

For the sipe of FIG. 9b, the sipe gradient ratio is 2-1-0. The radially outermost projection 80 has an axial-width k, while the next radially inward projection has an axial width 1, less than the axial width k. The radially innermost portion of the sipe has an extended length with no projection, and may be defined as having an axial width, as measured from the centerline, of zero. The ratio of the width is 2-1-0. While the sipes of FIGS. 9a and 9b illustrate two precise ratios, the width ratio may be any ratio of k>1>m≧0, where k is the maximum width of the sipe, 1 is the medium sipe width, and m is the radially innermost sipe width; all of the widths being measured from the sipe centerline CLs to the center of the projection vertex 82. A blade to form the sipes 74 of FIGS. 9a and 9b would mimic the decreasing axial extent of the projections in each horizontal row.

Figure 10A:
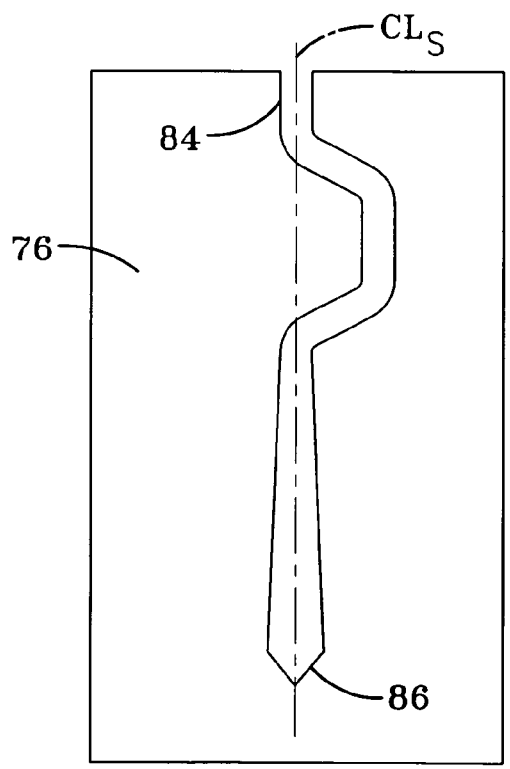
FIGS 10a–10b illustrate tapered 3-d sipes.
Figure 10B:
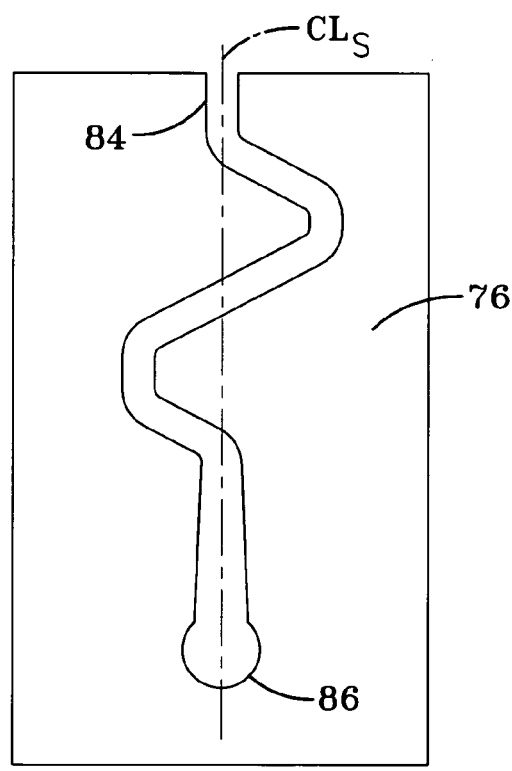

FIGS. 10a and 10b illustrate 3-dimensional sipes 84 formed in tread elements 76, each having a tapering thickness. The tapered thickness also allows for a decrease in tread stiffness as the tread element wears. As discussed above, the interlocking projections as the radially outer portion of the sipe increases the tread element stiffness when the tread is unworn while providing multiple biting edges for traction. The width of the sipe 84 gradually increases along the radial depth of the sipe 84. The radially innermost portion 86 of the sipe 84 may terminate with a reverse taper, as seen in FIG. 10a or may terminate with a bulbous portion, as seen in FIG. 10b. The blade forming such sipes increases in thickness towards the end of the blade that is farthest from the attachment of the blade to the mold.

Figure 11:
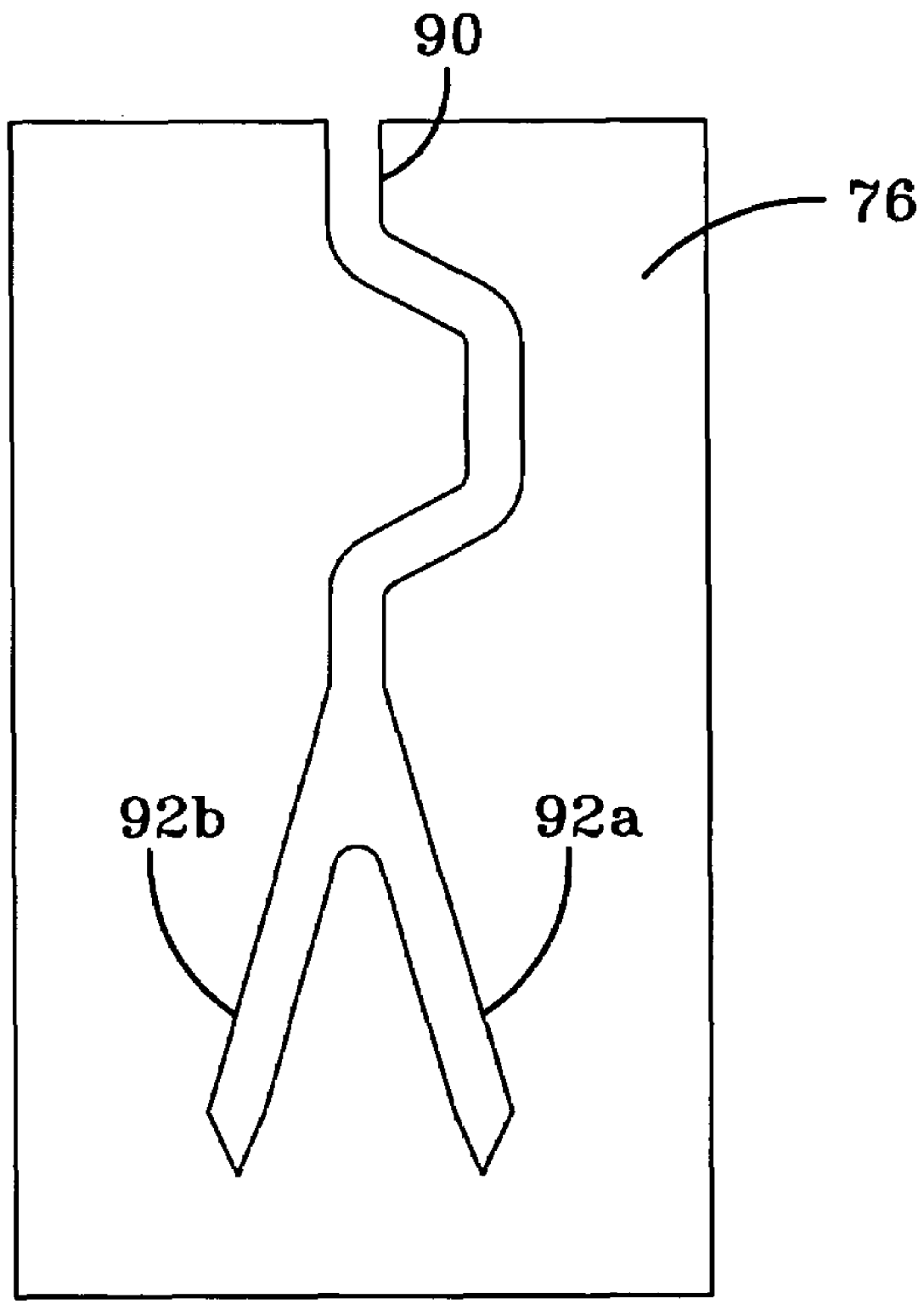
FIG. 11 illustrates a split 3-d sipe.

Another alternative to reduce the tread stiffness as the tire wears is to fork the sipe in the tread element depth. As seen in FIG. 11, at the radially inner portion of the sipe 90, the sipe 90 is divided into two portions 92a, 92b. Such forking of the sipe is well known in the art, and such sipes 90 may be combined with non-forked sipes, including the illustrated sipes 26, 74, to achieve a desired stiffness effect.

What is claimed is:

1. A tire tread, the tread having a plurality of ground engaging elastomeric elements, whereby at least one of the elements has a sipe, the sipe having a radial depth, a sipe face, an opposing sipe face, and a centerline located equidistant from the sipe faces, each sipe face has at least two horizontal rows of alternating recesses and protrusions of constant thickness, each recess on one sipe face is aligned with a protrusion on the opposing face, wherein, each recess or protrusion has at least four planes extending from the sipe centerline, wherein at the sipe centerline, at least one plane of each recess initiates a plane of an adjacent protrusion, and at least one plane of each protrusion initiates a plane of an adjacent recess and each recess or protrusion terminates in a planar vertex spaced from the centerline, the planar vertex being parallel to the sipe centerline.

2. The tire tread of claim 1 wherein the recesses and protrusions in the at least two horizontal rows of alternating recesses and protrusions are alternating in the radial direction of the sipe.

3. The tire tread of claim 1 wherein the planar vertex has a polygonal configuration, whereby the polygonal configuration has at least four sides.

4. The tire tread of claim 3 wherein the polygonal configuration is selected from the group consisting of quadrilateral, pentagonal, hexagonal, heptagonal, octagonal, nonagonal, decagonal, hendecagonal, and dodecagonal.

5. The tire tread of claim 3 wherein the planar vertexes of the protrusions and recesses are a combination of different polygonal shapes.

6. The tire tread of claim 1 wherein the cross sectional area of the protrusions and recesses, as determined at the sipe centerline, decreases as the radial depth of the sipe increases.

7. The tire tread of claim 1 wherein the at least four planes extend at an angle of less than 90° from the sipe centerline to its planar vertex.

8. The tire tread of claim 7 wherein at least two of the planes are inclined at identical angles relative to the sipe centerline and as measured from within the protrusion or recess.

9. The tire tread of claim 7 wherein at least two of the planes are inclined at different angles relative to the sipe centerline and as measured from within the protrusion or recess.

10. The tire tread of claim 1 wherein the axial extent of the protrusions and recesses decreases with the radial depth of the sipe.

11. The tire tread of claim 1 wherein the width of the sipe increases to a maximum axial width as the radial depth of the sipe increases.

12. The tire tread of claim 1 wherein the radially inner portion of the sipe is branched into two portions, with the protrusion and recesses located radially outward of the two portions.

13. A mold blade for mounting inside a tire mold to form a sipe in a tire tread, the blade defined by a centerline and having planar portions and at least one three dimensional pardon, wherein the three dimensional portion has at least two horizontal rows of alternating recesses and protrusions, wherein each recess or protrusion has at least four planes extending from the blade centerline, wherein at the blade centerline, at least one plane of each recess initiates a plane of an adjacent protrusion, and at least one plane of each protrusion initiates a plane of an adjacent recess and each recess or protrusion terminates in a planar vertex spaced from the blade centerline and the planar vertex is parallel to the blade centerline.

14. The mold blade of claim 13 wherein the blade has a constant thickness.

15. The mold blade of claim 13 wherein at the blade centerline, each recess and protrusion has a polygonal configuration.

16. The mold blade of claim 13 wherein the geometric configuration of the planar vertex of either a recess or a protrusion is similar to the geometric configuration of the recess or protrusion at the blade centerline.

17. The maid blade of claim 13 wherein the blade has at least one continuous horizontal row of alternating recesses and protrusions and at least one discontinuous row of alternating recesses and protrusions.

18. A tire, the tire comprising a tread, the tread having a plurality of ground engaging elastomeric elements, whereby at least one of the elements has a sipe, the sipe having a radial depth, a sipe face, an opposing sipe face, and a centerline located equidistant from the sipe faces, each sipe face has at least two horizontal rows of alternating recesses and protrusions of constant thickness, each recess on one sipe face is aligned with a protrusion on the opposing face, wherein, each recess or protrusion has at least four planes extending from the sipe centerline, wherein at the sipe centerline, at least one plane of each recess initiates a plane of an adjacent protrusion, and at least one plane of each protrusion initiates a plane of an adjacent recess and each recess or protrusion terminates in a planar vertex spaced from the centerline, the planar vertex being parallel to the sipe centerline.

19. The tire of claim 18, wherein the planar vertex has a polygonal configuration, whereby the polygonal configuration has at least four sides.

* * * * *